United States Patent [19]

Hawkins

[11] 4,029,252

[45] June 14, 1977

[54] APPARATUS FOR MAKING A COPPER-ALUMINUM TRANSITION JOINT

[75] Inventor: Kenneth G. Hawkins, Burnt Hills, N.Y.

[73] Assignee: General Electric Company, Schenectady, N.Y.

[22] Filed: May 17, 1976

[21] Appl. No.: 687,068

[52] U.S. Cl. .................................. 228/3.1; 228/13; 228/116; 228/904

[51] Int. Cl.[2] ......................................... B23K 21/00

[58] Field of Search ............ 228/3.1, 13, 115, 116, 228/904

[56] References Cited
UNITED STATES PATENTS

| | | | |
|---|---|---|---|
| 2,707,826 | 5/1955 | Sowter | 228/115 |
| 2,707,889 | 5/1955 | Sowter | 228/115 |
| 3,974,954 | 8/1976 | Brenan et al. | 228/13 |

Primary Examiner—James L. Jones, Jr.
Assistant Examiner—K. J. Ramsey
Attorney, Agent, or Firm—Vale P. Myles

[57] ABSTRACT

An apparatus for making a copper-aluminum transition joint characterized by utilizing a combination die and metal shears mounted between a pair of abrading brushes and wire feeding devices that are operable, respectively, to feed a copper wire and an aluminum wire into overlapping relationship between relatively movable die surfaces, after the wires have been abraded to remove oxidized portions thereof and to remove contaminants from the wires. The respective wire feeding devices cooperate with limit stops formed in the relatively movable dies to assure rapid, accurate positioning of the two wires over a punch in a double-action die that operates to form a cold welded transition joint between the wires when the dies are closed. The wire feed devices also selectively retract the sheared ends of the wires from the transition joint to facilitate rapid ejection of the joint from the die. A reciprocally operable pusher member is mounted adjacent the die punch to eject transition joints from the die in a direction transverse to the paths of movement of the copper and aluminum wires between the dies.

8 Claims, 6 Drawing Figures

4,029,252

APPARATUS FOR MAKING A COPPER-ALUMINUM TRANSITION JOINT

BACKGROUND OF THE INVENTION

The invention relates to apparatus for forming a transition joint between pieces of copper and aluminum; and more particularly, relates to apparatus for cold welding copper and aluminum transition joints in a relatively continuous, high volume manner that consistently affords reliable transition joints of good quality.

Heretofore, numerous attempts have been made to develop machinery for suitably cold welding, or otherwise fastening together, wires or bar stock of copper and aluminum in order to provide transition joints between systems utilizing these two relatively common metals. The need for suitable copper-aluminum transition joints is particularly great in various facets of the electrical connector industry in which it is common to encounter interconnected circuits using both of these metals. However, in addition to creating a strong demand for such transition joints, the environment in which many electrical circuits are utilized presents particularly difficult application problems insofar as the necessary characteristics of such transition joints are concerned. For example, it has been found that copper-aluminum transition joints used to make electrical connections between aluminum motor windings and copper power distribution circuits to which the windings are coupled are very likely to fail due to thermal cycling and mechanical vibration of the joints, if the joints do not, in fact, meet a high standard of quality and reliability. Such prior art problems and one optimum solution to them are described at some length in co-pending U.S. patent applications Ser. Nos. 591,833 and 591,838 which were both filed on June 30, 1975 and are assigned to the assignee of the present invention.

As is pointed in those applications, it has been found to be particularly desirable to form copper-aluminum transition joints for electrical circuit application by a method that results in a cold-weld intermetallic connection being formed between the joined copper and aluminum pieces. The present invention is directed toward an apparatus for reliably making such cold-welded transition joints on a high volume production basis suitable for mass production end uses of the connector joints.

In view of the large number of earlier attempts that have been made to manufacture suitable copper-aluminum transition joints, obviously wide variety of types of connector manufacturing apparatus has already been developed by others. Typically, such apparatus simply utilizes die means to crimp or otherwise mechanically deform the bar stock or wire that is to be joined together to form a suitable transition joint. One example of such a relatively common die means is shown in U.S. Pat. No. 3,708,878, which issued on Jan. 9, 1973. Known prior art apparatus such as that exemplified by the foregoing patent has, of course, been generally suitable for manufacturing simple bi-metal transition joints in which it is not imperative that a uniform intermetallic cold welded junction of high mechanical and electrical integrity be formed. However, when copper-aluminum transition joints are to be used in those electrical circuit environments that subject the joints to severe thermal cycling and extensive mechanical vibration such as that produced by electric motors, as described in the above-mentioned co-pending patent applications, it has become necessary to develop an apparatus for more rapidly forming transition joints of greater uniform quality and reliability than has been available heretofore.

A primary object of the present invention is to provide an apparatus for forming aluminum-to-copper transition joints that overcome the above-mentioned disadvantages of related prior art apparatus.

Another object of the invention is to provide a copper-aluminum transition joint forming apparatus that affords a relatively continuous, high speed means for producing electrically and mechanically reliable transition joints on an economical basis.

Additional objects and advantages of the invention will be apparent from the description of it that follows considered in conjunction with the attached drawings.

SUMMARY OF THE INVENTION

In one preferred embodiment of the invention an apparatus for forming aluminum-copper transition joints is provided having a pair of relatively movable dies, one of which is a double-action die including a punch. Mounted on opposite sides of the die are, respectively, first and second abrading brushes and wire feeding apparatus for moving an aluminum wire and a copper wire past the respective brushes in abrading relationship with them. The relatively movable dies are provided with two generally planar surfaces connected respectively by step risers that operate as limit stops to assure accurate positioning of the respective wires in overlapping relationship above the punch when the wire feeding means are operated to move the wires between the dies. Control means are actuated by movement of the copper and aluminum wires to selectively drive the abrading brushes only when the wires are in motion. As the dies are moved relative to one another following the arrangement of a copper and an aluminum wire in overlapping relationship above the punch, metal shears cooperate with one of the dies to sever the copper and aluminum wires at respective points thereon between the wire feed means and the dies. Further movement of the dies toward one another forces the aluminum and copper wires to flow around the punch and form a desired intermetallic cold weld between the wires. The wire feeding apparatus then retracts the sheared ends of the two wires from the edges of the shears. Then, as the dies are moved apart, a pusher member acts on the welded transition joint to drive it off of the punch and move it in a direction transverse to the paths of movement of the wires between the dies, thereby to eject the transition joint from the apparatus and prepare it to receive subsequent sections of the copper and aluminum wires to be welded into similar transition joints.

DESCRIPTION OF THE PREFERRED EMBODIMENT

Figure 1:
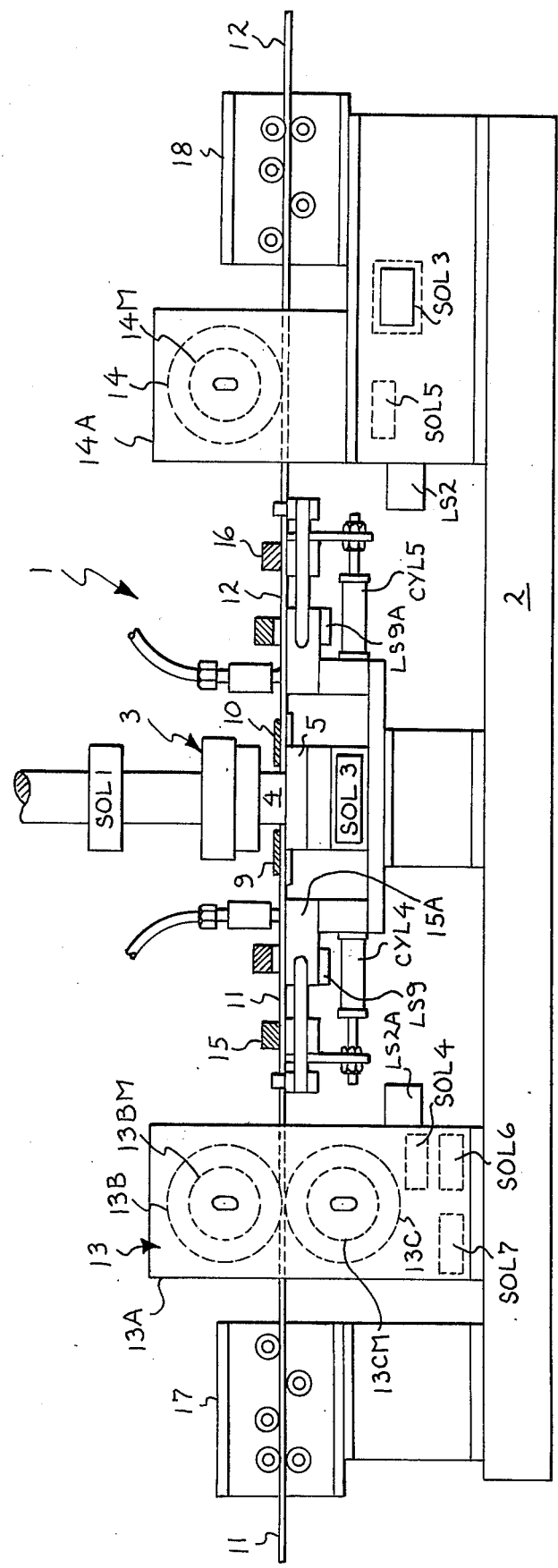
FIG. 1 is a side elevation view of the copper-aluminum transition joint forming apparatus constructed pursuant to the teaching of the invention, and shown with respect to an aluminum wire and a copper wire being fed into the apparatus to supply the respective component parts of a plurality of transition joints to be formed by the apparatus.

Referring now to FIG. 1 of the drawing, it will be seen that there is shown an apparatus designated generally by numeral 1, for making a copper-aluminum transition joint pursuant to the present invention. A suitably rigid, generally flat metal bed 2 fabricated of conventional angle and sheet material is provided as a common foundation for the respective component parts of the apparatus 1. Mounted on the bed 2 by being bolted thereto, or otherwise suitably fastened by welding or similar conventional holding techniques, is a press 3 that has a pair of relatively movable dies 4 and 5 that are operable in a manner that will be described herein to form a cold-welded, copper-aluminum transition joint. The lowermost die 5 is a double-action die including a punch 6, that is shown in FIGS. 2, 3 and 4.

It will be recognized as the description of the invention proceeds that a variety of different types of commercially available presses can be used to perform the functions required of the press 3 used in the preferred embodiment of the invention. With this embodiment, the press 3 is a Model No. FH20-20 HC304F type Multipress commercially available from Dennison Division of Abex Corporation, Columbus, Ohio. The hydraulic press control and selective operation of such a press is described in U.S. Pat. No. 3,176,466, issued on Apr. 6, 1965 and U.S. Pat. No. 3,191,502, issued on June 29, 1975.

Figure 2:
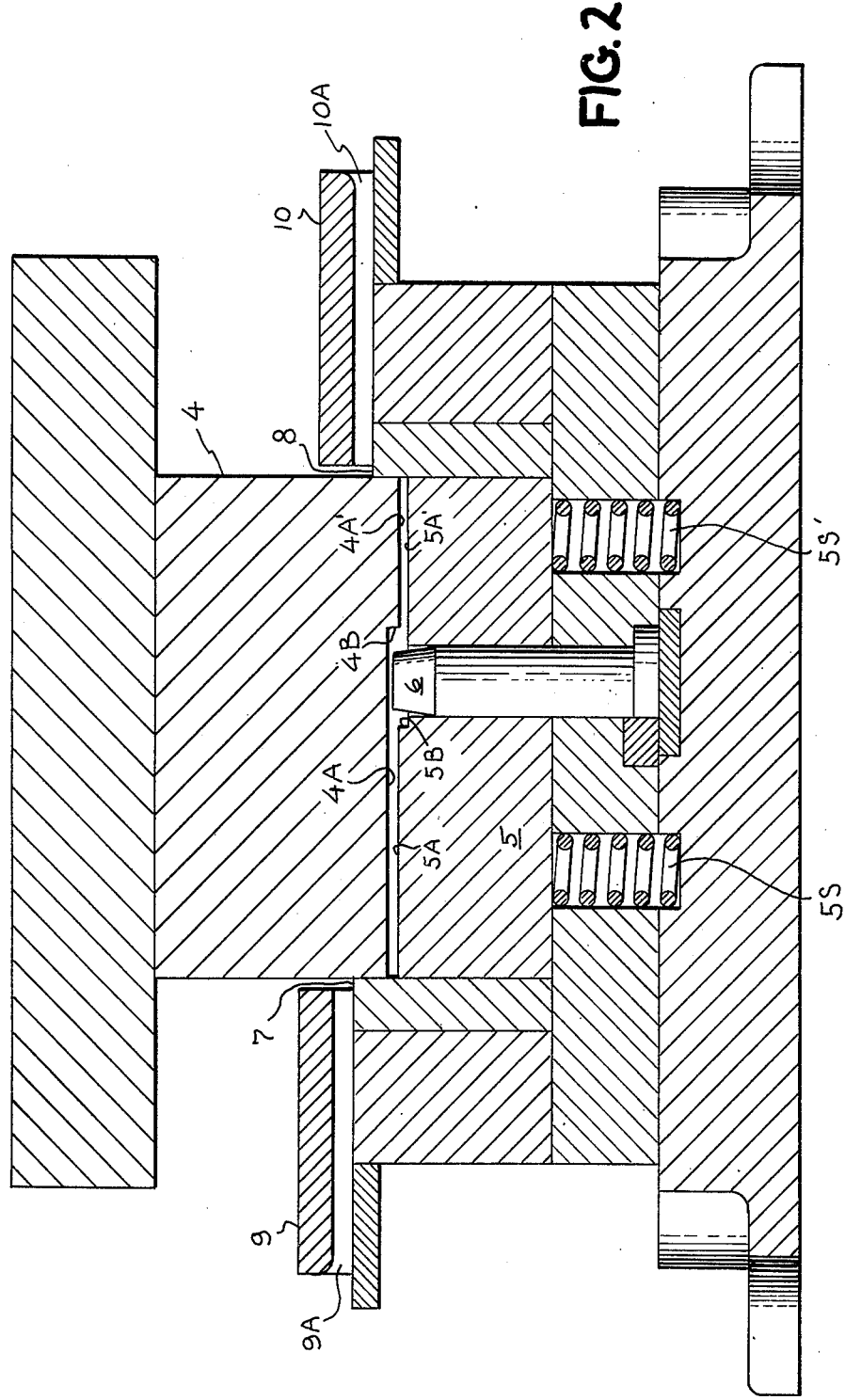
FIG. 2 is a side elevation view, partly in cross-section, showing the relatively movable dies of the apparatus illustrated in FIG. 1, and particularly depicting the preferred die stepped-surface configurations adjacent the punch, which are used pursuant to the invention to accurately form a plurality of cold-welded transition joints.
Figure 3:
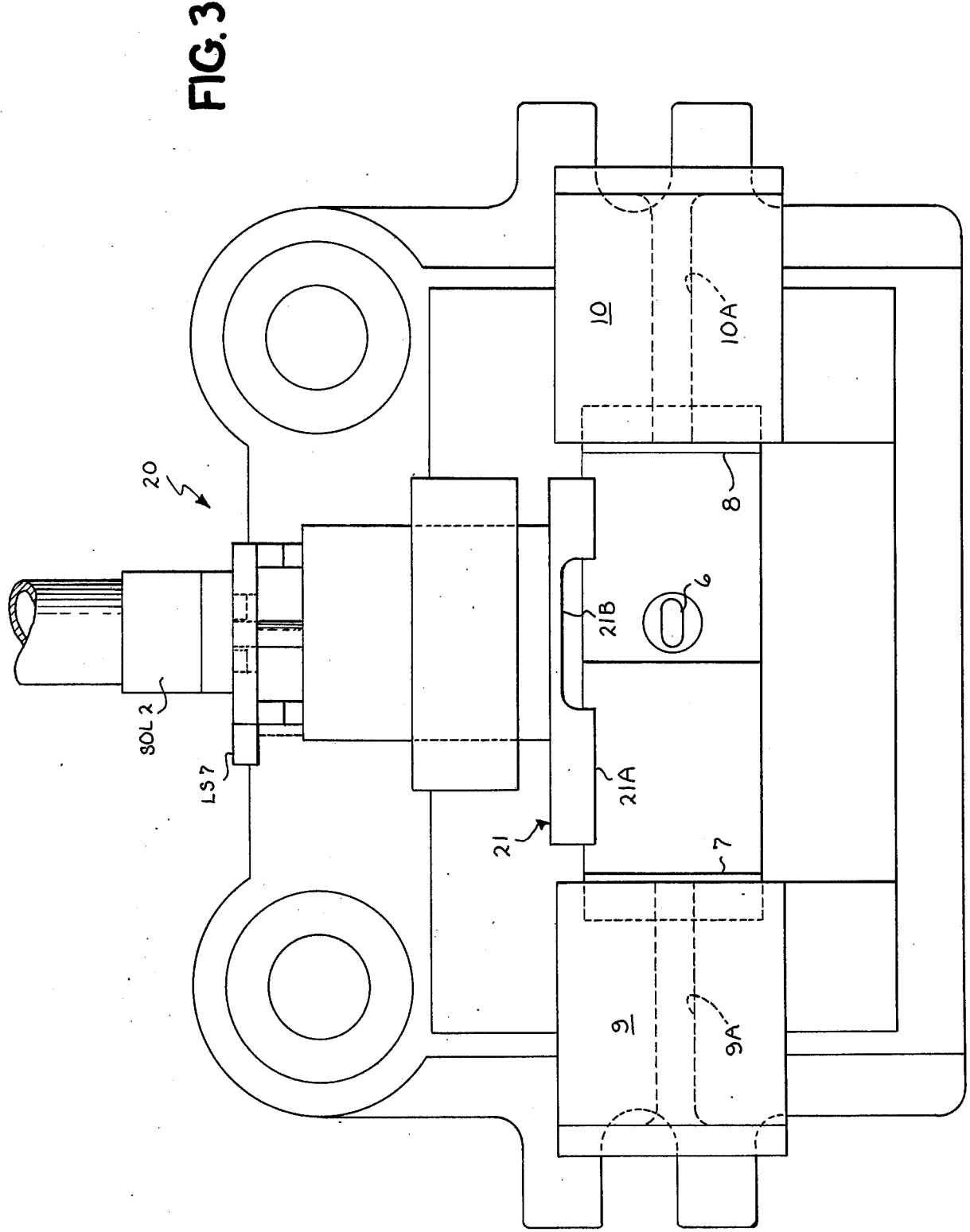
FIG. 3 is a top plan view of a double-action die and punch used as a component part of the apparatus illustrated in FIG. 1, shown with respect to a transition joint ejector mechanism operably mounted on the apparatus pursuant to the invention.
Figure 4:
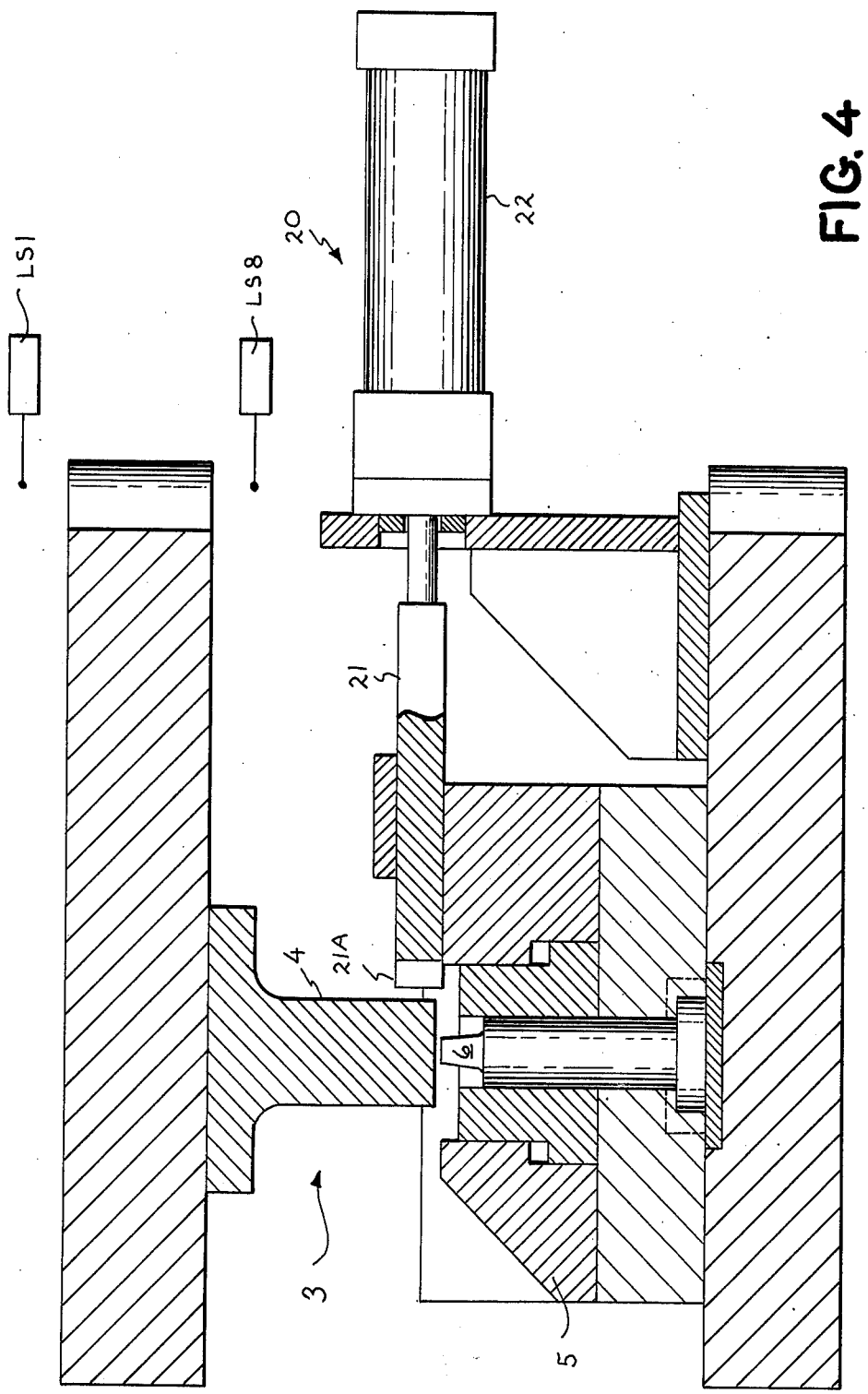
FIG. 4 is a side elevation view, partly in cross-section, showing the right side of the ejector mechanism illustrated in FIG. 3.

Mounted on the lower die 5, on opposite sides of the upper die 4 are a first metal shear 7 and a second metal shear 8 (see FIGS. 2 and 3). The first and second metal shears 7 and 8 are operable with the orthogonal outer edges of the die 4, as best shown in FIG. 2, to shear strips of metal moved therebetween. Mounted directly above the shears 7 and 8, respectively, are a pair of channeled guide mechanisms 9 and 10 (also seen in FIGS. 2 and 3) which, in this embodiment of the invention, define rectangular passageways 9A and 10A for guiding aluminum and copper wires, respectively between the dies 4 and 5, as will be described in detail below. In this form of the invention, it should be understood at this point that aluminum bar stock and copper bar stock are to be moved into the press 3 to form a copper-aluminum transition joint. In other embodiment of the invention it will be understood that aluminum and copper wires or other suitable forms of metal stock may be used to manufacture such transition joints with the apparatus of the invention; thus, when reference is made herein to either copper and aluminum wire or bar stock, it will be appreciated that various interchangeable forms of such material may be used in implementing the invention.

An essential feature of suitable copper-aluminum transition joints for use in many electrical circuit applications is the elimination of metal oxides and other contaminants from the intermetallic region of the joint. In order to thus suitably clean an aluminum wire, or piece of bar stock such as that generally designated herein by the numeral 11, and a similar strip of copper bar stock designated herein with the numeral 12, a first abrading brush indicated generally by the numeral 13 and a second abrading brush designated by the numeral 14 are mounted on opposite sides of the press 3 and are journaled for rotation within suitably rigid metal housings 13A and 14A, which are in turn bolted or welded to a metal bed 2, or support structure thereon, as shown in FIG. 1. Actually, in the preferred embodiment of the invention, the first abrading brush 13 comprises a pair of wire brushes 13B and 13C that are positioned, as shown in FIG. 1, to simultaneously abrade the top and bottom surfaces, respectively, of the aluminum wire 11. Because of the overlapping relationship that is provided by the subject apparatus when the aluminum wire 11 is positioned over the copper wire 12 in the press 3 in practicing the invention, only a single brush 14 is used to abrade and clean the upper surface of the copper wire 12 in this embodiment of the invention. Likewise, in some embodiments of the invention a single brush, such as brush 13C, can be used to clean aluminum wire 11.

The abrading brushes are mounted on separate vertically movable drive shafts that are driven respectively by electric motors 13BM, 13CM explained 14M, each suitably mounted on the brush housing 13A and 14A. The relative vertical positions of the drive shafts of brushes 13B and 13C are controlled by a first brush drive control means in the form of pneumatic cylinders that are actuated by solenoids SOL 6 and SOL 7, respectively, as will be described more fully below. Likewise, the selective vertical position of the drive shaft of brush 14 is controlled by a second brush drive control means in the form of a pneumatic cylinder that is actuated by a solenoid SOL 8, the operation of which is also explained later. Although a variety of readily available cylinders and solenoids may be used to move the brushes 13B, 13C and 15 to and from their wire abrading positions as the aluminum and copper wires are intermittently fed into the press 3, in the preferred embodiment of the invention, it has been found suitable to employ Model A61B brush drive cylinders commercially available from Miller Fluid Power Corporation of Bensville, Illinois. It should also be understood that the first and second brush drive control are made responsive to movement of the respective aluminum wire 11 and copper wire 12 such that the abrading brushes are only driven into engagement with wires 11 and 12 when they are being moved by the wire feeders 15 and 16 (described more fully in the next paragraph). This key feature of the invention enables the wires to be suitably cleaned without risking unacceptable variations in their thickness due to excessive abrasion occuring when the wires are held in a stopped position while press 3 is operated to cold weld the wires together.

In order to feed aluminum and copper wires, respectively, from suitably mounted supply spools (not shown), which will necessarily be positioned to the left and right sides, respectively, of the apparatus 1 as illustrated in FIG. 1, wire feeders are mounted on opposite sides of the press 3 between the brushes 13 and 14 and the dies 4–5. In particular, a first wire feeder 15 is mounted in reciprocal operating relationship adjacent the die 4 on a suitable bracket 15A, as shown in FIG. 1, between the die 4 and the brush 13 and is operable to intermittently move an aluminum wire (11) past the first brush 13 in abrading relationship with it and then feed the aluminum wire to a desired position over the punch 6. Similarly, a second wire feeder 16 is mounted between the die 4 and the second abrading brush 14 and is operable to move a copper wire (12) past the second brush in abrading relationship with it and then feed the copper wire into overlapping relationship with the aluminum wire positioned over the punch 6. Of course, any suitable wire feeding mechanism may be used, but in this embodiment of the invention a Model C-3, Serial 8-74 type stock feed mechanism available commercially from Rapid Air Corporation of Madison, S. Dak. is employed for both the first and second wire feeders 15 and 16. Such a stock feed mechanism and its mode of operation is described in U.S. Pat. No. 3,038,645 which issued June 12, 1962.

It is also desirable to move the aluminum and copper wires into overlapping relationship with the sides thereof in close abutting engagement prior to formation of the type of high quality intermetallic transition joints desired from the apparatus 1. Toward that end, a first wire straightener 17 and a second wire straightener 18 are mounted respectively beside the first and second brushes 13 and 14 on the sides thereof furthest from the press 3. The wire feeders 15 and 16 are operable to move the aluminum and copper wires 11 and 12, respectively, through the first and second wire straighteners 17 and 18 and thence into abrading relationship with the first and second brushes 13 and 14, respectively. In the preferred embodiment of the invention the wire straighteners 17 and 18 are Copper Weymouth, four-roll economy straighteners having rollers approximately one inch in diameter and 6 inches in width. Obviously, other suitable wire straighteners may be used in other forms of the invention.

Operation of the apparatus 1 of the invention is facilitated by the provision of suitable wire limit stop means in the dies 4 and 5 so that movement of the aluminum and copper wires into their desired overlapping relationship is provided in an optimum manner. Referring particularly to FIG. 2 of the drawing, one preferred form of this desirable characteristic of the invention will be described in more detail. As seen in FIG. 2, the first die 4 has a stamping surface that includes two generally planar portions 4A and 4A' and a step riser 4B that extends between the generally planar portions thereof. Similarly, the double-action die 5 has a stamping surface including planar surfaces 5A and 5A' and an interconnecting step riser 5B. The step risers 4B and 5B are positioned respectively on opposite sides of the punch 6 in this preferred embodiment of the invention and are spaced at least one-eighth inch therefrom. Such spacing is used to prevent the cold welded portions of transition joints formed by punch 6 from being wedged between the punch and the step risers. Also, in the preferred embodiment of the invention height of the step risers 4B and 5B is substantially equal to the thickness of the respective wires 11 and 12 fed into abutting engagement therewith. This arrangement enables the wires 11 and 12 to be slid respectively along the planar surfaces 4A and 5A' into overlapping relationship.

It will be understood that the step risers 4B and 5B are disposed substantially transverse to the respective paths of movement of the aluminum and copper wires (11 and 12) into the press 3. In the preferred mode of operation for apparatus 1, the aluminum wire 11 is moved by the first wire feeder 15 into approximate abutting engagement with the step 4B in the first die 4 while the copper wire 12 is moved by the second wire feeder 16 into approximate abutting engagement with the step riser 5B in the second die 5, thereby to place the wires in a desired overlapping relationship over the punch 6 prior to the time that the upper die 4 is closed toward the lower double-action die 5. Such a relative positioning of the dies 4 and 5 is indicated generally in FIG. 1. By approximate abutting engagement of wires 11 and 12 with step rises 4B and 5B, it is meant that the wires are preferably stopped about 1/16 inch short of the risers by the operation of feeders 15 and 16; however, if that action is not precise due to tolerances in the control system the risers will serve as limit stops to arrest further movement of the wires, or force them to buckle and thereby indicate a malfunction or misadjustment to an operator of the apparatus.

Finally, in order to assure rapid and positive ejection of the transition joints from between dies 4 and 5 after each joint is formed, an ejecting means 20 (see FIGS. 2 and 3) is provided on apparatus 1. In this form of the invention the ejection means 20 comprises a pusher member 21 that is mounted on the press 3 for reciprocal movement in a direction transverse to the paths of movement of the aluminum and copper wires into the above-described overlapping relationship. In its preferred form the pusher member 21 includes a hammer face 21A that is formed to contact each transition joint at spaced points thereon located on opposite sides of the cold welder portions of the respective joints when the pusher member 21 is actuated into driving relationship with the respective transition joints. In the embodiment of the invention being described, the hammer face 21A of the pusher member is generally flat and includes a recess 21B at the central portion of the face for receiving therein, without engagement occurring therewith, the enlarged cold welded portions of the respective transition joints. The purpose of the recessed portion 21B of the hammer face 21A is to enable the transition joints to be contacted substantially simultaneously by the two outermost parts of the hammer face 21A so that the joints are driven from the punch 6 in a direction perpendicular to the path of movement of the wires 11 and 12, thereby to avoid any twisting movement of the transition joints, which could cause them to be wedged in the die 4 and 5.

As will be described more fully below, the operation of the pusher member 21 is controlled by a solenoid SOL 2 (see FIG. 3) and the pusher member is operable to contact each transition joint with a snap action due to the fact that the hammer face 21A is first driven into contact with the rear side of die 4 by actuation of limit switch LS 8 as soon as the die 4 reaches its lowermost position, as will be described more fully in the discussion given below of the operation of the controls for apparatus 1. Thus, the pusher member actuating pneumatic cylinder 22 houses a reciprocal piston that exerts a force on the pusher member 21 when switch LS 8 is triggered. That force is built up as the die 4 is raised following formation of a cold welded transition joint.

When the lower edge of die 4 is raised above the pusher member 21, it snaps into contact with the transition joint and drives it from the punch 6. At the same time, as best seen in FIG. 2, when the die 4 is raised the double action die 5 also raises due to the compression force of springs 5S and 5S' forcing the transition joints upward from the punch 6 into a position that enables them to be easily driven from between the dies 4 and 5 by the snap-action of pusher member 21.

Figure 5:
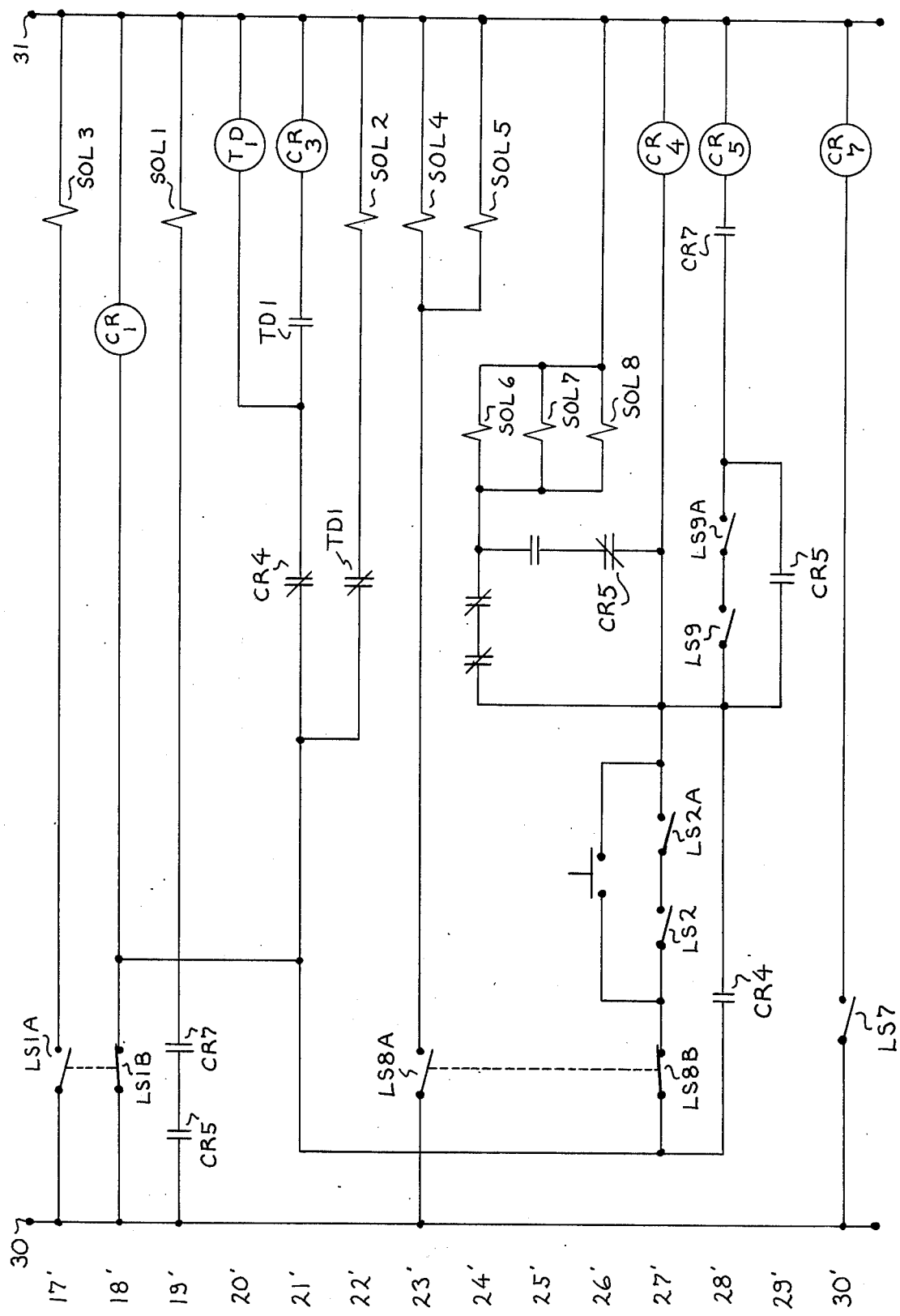
FIG. 5 is a schematic diagram of an electrical circuit suitable for controlling the apparatus illustrated in FIG. 1.
Figure 6:
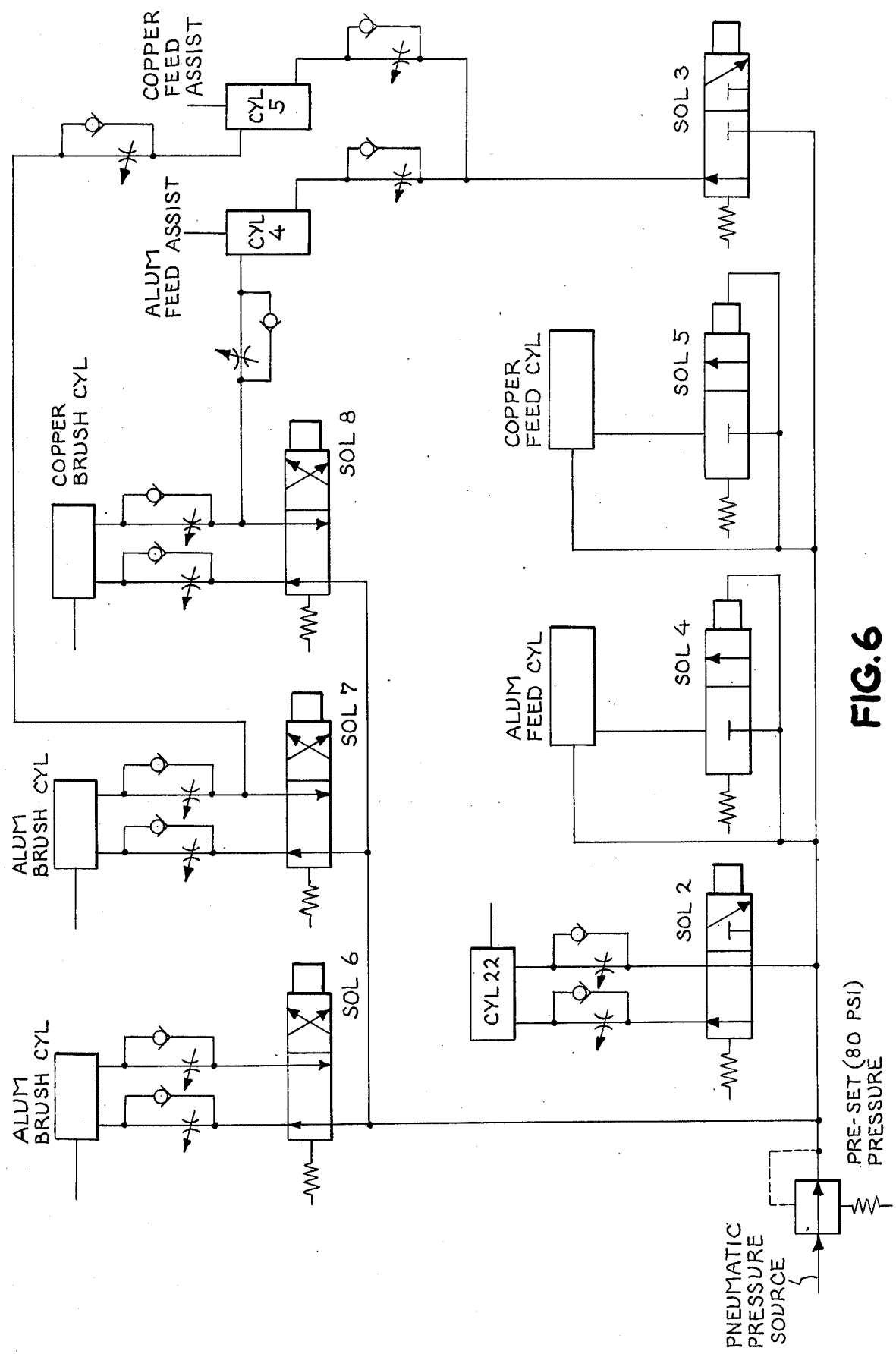
FIG. 6 is a schematic diagram of a pneumatic control system for the apparatus illustrated in FIG. 1, shown with respect to certain of the electrically actuated solenoids illustrated in FIG. 5.

The operation of certain characteristic portions of the control for apparatus 1 will now be described with particular reference to FIGS. 1, 5 and 6 of the drawing. It will be understood that electrical and pneumatic control of the transition joint manufacturing apparatus 1 can be achieved by utilizing a variety of commercially available sequential switching control means, such as an appropriately wired program control and commercially available stepping switches. However, a preferred electrical control system for the apparatus 1 is illustrated in FIG. 5 in simplified form and generally includes a sequencing circuit utilizing latching relays to inhibit loss of sequence in the event power supply to the system is interrupted. The system applies a 220 volt AC current source across terminals 30 and 31, via any suitable conventional arrangement of start, stop and safety interlock switches, to permit energization of all the sequencing circuits so the cold-welding cycle can be initiated by simply closing a typical start button type switch (not illustrated).

Although FIG. 5 does not illustrate all of the necessary conventional power supply and motor control circuitry that, of course, must be employed to actuate a hydraulic press motor for the press 3, as described in the above-referenced U.S. Pat. No. 3,176,466, and the various associated motors for pressurizing the pneumatic control circuit illustrated in FIG. 6, and for driving the abrading brushes 13BM, 13CM and 14M, respectively such components can be readily assembled in suitable operating relationship by those skilled in the art. The simplified control circuit shown in FIG. 5 is intended only to provide a brief description of one suitable characteristic control arrangement that may be used in practicing the characteristic process sequence provided by the apparatus of the invention. Similarly, the respective locations of the solenoids designated schematically in FIGS. 5 and 6, and illustrated graphically in the other Figures of the drawings are only depicted to identify suitable mounting arrangement for these components rather than being suggestive of any necessary physical arrangement thereof. On the other hand, the electrical and pneumatic control circuits shown in FIGS. 5 and 6 illustrate the preferred operating interrelationship of the respective components of apparatus 1.

To describe the operation of apparatus 1, it can be assumed that the main starting switches and circuit breakers of the control system are closed to energize the hydraulic press motor for press 3 and to actuate the three wire brush drive motors 13BM, 13CM and 14M. Also, all necessary safety interlock gates should be closed and the control circuit for the apparatus 1 placed in an automatic control sequence so that power will be applied across the input lines 30 and 31 in FIG. 5. Assuming that the apparatus is at a portion in its operating cycle such that the piston in operating cylinder 22 of the transition joint ejector means 20 is in its retracted position so that the pusher member 21 is withdrawn away from the die 4, closing the limit switch LS 7 (see FIG. 3, as well as FIG. 5) to indicate that the dies 4 and 5 are clear and ready to start a new operating sequence, with the contacts CR 7 in lines 19' and 28' closed. (At this point it can be noted that in FIG. 5 the same alpha-numerics used to designate each relay coil are used to designate all of the contacts actuated by that coil. It will also be noted that the same identifying alpha-numerics are used in FIGS. 5 and 6, as well as in the other Figures of the drawings, to identify the same components throughout). In this start position the die 4 is in its uppermost position where it engages limit switch LS 1 (see FIG. 4). Such engagement with LS 1 closes its contact LS 1A to energize solenoid SOL 3 (FIG. 6) and set the wire feed assist cylinders CYL 4 and CYL 5. At the same time, limit switch LS 8 is out of engagement with die 4 so normally-closed contacts LS 8B are closed to supply energizing current to solenoids SOL 6, SOL 7 and SOL 8 through limit switch contacts LS 2 and LS 2A, which are closed in this phase of the operating cycle to move brushes 13B, 13C and 14 into abrading relationship with wires 11 and 12. Likewise, contacts LS 8A are open causing solenoids SOL 4 and SOL 5, respectively, to actuate their associated aluminum feed cylinder and copper feed cylinder (see FIG. 6) to advance new portions of the wires 11 and 12 between dies 4 and 5. Thus, as the wires 11 and 12 are advanced, simultaneously, the abrading brushes are engaged with the wires. This feeding operation of the wire feeders 15 and 16, which are clamped respectively on the aluminum wire 11 and the copper wire 12 by the operation of solenoids SOL 4 and SOL 5 in this portion of the operating cycle, is continued until the limit switches LS 9 ad LS 9A (see FIG. 1 as well as FIG. 5) are engaged by the wire feeders 15 and 16 as they reach the ends of their respective wire feed strokes. The contacts of limit switches LS 9 and LS 9A are located in line 28' of FIG. 5. As these contacts close, relay CR 5 is energized to open its normally closed contacts CR 5 in one of the lines (from line 27') and cause solenoids SOL 6, SOL 7 and SOL 8 to be operated to move the respective abrading brushes 13B, 13C and 14 out of abrading relationship with the wires 11 and 12. Simultaneously, solenoid SOL 1, in line 19' of FIG. 5, is energized by the closing of contacts CR 5 in that line, causing die 4 to travel downward for its press stroke.

When die 4 approaches the lower end of its range of travel, as seen in FIG. 4, it will engage limit switch LS 8 causing contact LS 8A in line 23' of FIG. 5 to be closed thereby energizing solenoids SOL 4 and SOL 5 and causing the aluminum wire feed cylinder and the copper wire cylinder (see FIG. 6) to return wire feeders 15 and 16 to their outermost positions for new material pick-up. This movement of the feeders 15 and 16 brings them respectively into contact with the limit switches LS 2A and LS 2 (see FIG. 1, as well as FIG. 5). As seen in line 27' of FIG. 5, with the contacts LS 2 and LS 2A closed relay CR 4 is actuated, to close contacts CR 4 in line 28' and cause solenoids SOL 6, SOL 7 and SOL 8 to again move the abrading brushes into engagement with wires 11 and 12. When die 4 contacts limit switch LS 8, normally closed contacts LS 8B, in line 27' of the diagram in FIG. 5 are opened to reset the wire brushing sequence for the next cycle of operation.

Of course, when the die 4 moved out of contact with the upper limit switch LS 1 at the beginning of its press stoke, the normally opened contacts LS 1A shown in line 17' of FIG. 5 opened and deenergized solenoid SOL 3. This is an important aspect in the operation of the present invention because when the soldnoid SOL 3 is thus deenergized it causes the feeder assist cylinders CYL 4 and CYL 5 (see FIGS. 1 and 6) to push the respective wire feeders 15 and 16 into slightly retracted positions such that they withdraw wires 11 and 12 away from the cutting edges of shears 7 and 8. In the preferred embodiment of the invention the wires 11 and 12 are retracted approximately 1/64ths of an inch from the cutting edges of the shears 7 and 8 by this operating step in order to enable the ejector means 20 to subsequently drive the transition joints from between the dies 4 and 5 without hanging them up on either end of the wires 11 or 12. It has been found that without such a controlled retraction of the wires 11 and 12, prior to attempted ejection of the transition joints from between the dies 4 and 5, it is virtually impossible to assure the desired continuous high speed operation of the apparatus 1 of the invention.

Referring again to FIGS. 4 and 5, it will be seen that as die 4 leaves limit switch LS 1 in its press-stroke movement toward die 5, the normally closed contacts LS 1B of limit switch LS 1, seen in line 18' of FIG. 5, are closed and thus energize solenoid SOL 2 shown in line 22'. Solenoid SOL 2, as also seen in FIGS. 3 and 6, actuates pneumatic cylinder 22 to drive the pusher member 21 into engagement with the rear side of the die 4 before the die begins its upward movement following a cold welding operation. With the preferred form of the invention, the multi-press 3 returns automatically to its uppermost position after a pre-determined value of press tonnage has been exerted on the overlapped wires 11 and 12 on the punch 6. Of course, the pre-set tonnage is selected to achieve a desired degree of metal flow to effect suitable intermetallic action between the two wires and form a high quality cold weld. Since the ejector means is actuated prior to the time that the die 4 moves upward, as the die 4 clears the upper edge of the pusher member 21, the hammer face 21A of the pusher member snaps forward and contacts the ends of the transition joint outward from the cold welded portion thereof. This simultaneous contact of the two outer ends of the transition joint causes it to be driven sharply from the punch 6 and from between the dies 4 and 5. Normally closed contacts TD 1 in line 22' of FIG. 5 are operated by a conventional time delay relay TD 1 line 20' of FIG. 5), to deenergize solenoid SOL 2 and cause the pusher member 21 of ejector means 20 to be retracted toward the cyliner 22 after a pre-determined time interval. In the preferred embodiment of the invention this predetermined time interval is usually set at about 4/10ths of a second to provide adequate time for an operator to visually check to make sure that each transition joint is completely cleared from between the dies 4 and 5 before the next cold welding cycle commences. When the pusher member 21 is thus retracted, limit switch LS 7 is again picked up and the cycle just described is repeated to form the next cold welded transition joint.

From the foregoing description of the apparatus of the invention and its mode of operation those skilled in the art will recognize that various alternative forms and modifications of the invention may be made without departing from the true spirit and scope of the invention; accordingly, the following claims are intended to set forth the appropriate limits of the invention.

What I claim as new and desire to secure by Letters Patent of the United States is:

1. Apparatus for making a copper-aluminum transition joint comprising a press having relatively movable first and second dies, the second one of which is a double-acting die including a punch, and having first and second metal shears positioned respectively on opposite sides of said second die and operable to shear strips of metal, first and second rotatable abrading brushes mounted respectively on opposite sides of said press, brush drive means operatively coupled to selectively rotate said brushes, first and second wire feeders mounted respectively on opposite sides of said press between the dies and the brushes, said first wire feeder being operable to intermittently move an aluminum wire past the first brush in abrading relationship therewith and feed the aluminum wire to a position ove the punch, said second wire feeder being operable to intermittently move a copper wire past the second brush in abrading relationship therewith and feed the copper wire into overlapping relationship with the aluminum wire positioned over said punch, first and second brush drive control means responsive respectively to movement of an aluminum wire or a copper wire by said wire feeders to actuate the brush drive means to move said brushes into abrading relationship with said wires and to rotate said brushes, said press being operable responsive to movement of a copper and an aluminum wire into overlapping relationship over the punch to drive said first die toward the punch and the shears therby to shear the copper and aluminum wires and force the overlapped portions of both wires around the punch thereby to form a cold welded intermetallic transition joint between the wires, said first and second wire feeders being operable respectively to retract the aluminum wire and the copper wire predetermined distances back from the shearing edges of said shears responsive to completion of the shearing movement of said first die to shear said wires, and ejecting means mounted on said press and operable to drive a transition joint from between the retracted ends of the aluminum and copper wires and out the press responsive to movement of said first die away from the punch.

2. An apparatus as defined in claim 1 wherein said ejecting means comprises a pusher member mounted on the press for reciprocal movement in a direction transverse to the paths of movement of the aluminum and copper wires into overlapping relationship, said pusher member being operable to contact a transition joint with a snap action to drive it away from said punch 3. Apparatus as defined in claim 2 wherein said pusher member includes a hammer face that is formed to substantially simultaneously contact a transition joint at spaced points thereon located on opposite sides of the cold welded portion thereof when the pusher member snaps into driving relationship with the transition joint.

4. Apparatus as defined in claim 3 wherein the hammer face of said pusher member is generally flat and includes a recess at the central portion thereof for receiving therein, without engagement therebetween, the cold welded portion of said transition joint.

5. An apparatus as defined in claim 1 including first and second wire straighteners mounted respectively beside the first and second brushes on the sides thereof furthest from said press, said wire feeders being operable to move an aluminum and a copper wire respectively through said first and second wire straighteners and thence into abrading relationship with the first and second brushes, respectively.

6. An apparatus as defined in claim 1 wherein said first and second dies each have a stamping surface that includes a step riser therein that extends between two generally planar portions of its stamping surface, said steps being positioned respectively on opposite sides of the punch.

7. An apparatus as defined in claim 6 wherein said step risers operate as limit stops respectively transverse to the paths of movement of said aluminum and copper wires into the press, said aluminum wire being movable by the first wire feeder into a position immediately adjacent the step riser in said first die and said copper wire being movable by said second feeder into a position immediately adjacent the step riser in said second die thereby to place the wires in overlapping relationship between the two step risers.

8. An apparatus as defined in claim 7 wherein said step risers are each spaced from the punch by at least one-eighth inch and wherein the height of each step is substantially equal to the thickness of the wire fed into abutting engagement therewith.

* * * * *